United States Patent [19]

Waddan

[11] 3,891,707

[45] June 24, 1975

[54] HYDROGENATION PROCESS

[75] Inventor: Dhafir Yusuf Waddan, Blackley, England

[73] Assignee: Imperial Chemical Industries Limited, London, England

[22] Filed: May 22, 1972

[21] Appl. No.: 255,669

[30] Foreign Application Priority Data

June 4, 1971 United Kingdom............. 19008/71

[52] U.S. Cl.......... 260/583 K; 260/583 P; 252/433; 260/432; 260/465.5 R; 260/566 R
[51] Int. Cl............................................ C07c 85/10
[58] Field of Search.................... 260/583 K, 563 D

[56] References Cited
UNITED STATES PATENTS

| | | | |
|---|---|---|---|
| 2,165,515 | 7/1939 | Schmidt.......................... | 260/563 D |
| 2,166,152 | 8/1939 | Howk.............................. | 260/583 K |
| 2,784,232 | 3/1957 | Terry et al. .................... | 260/583 K |

FOREIGN PATENTS OR APPLICATIONS

| | | | |
|---|---|---|---|
| 125,571 | 10/1960 | U.S.S.R.......................... | 260/583 K |

OTHER PUBLICATIONS

Chem. Abstracts, Vol. 54, No. 2, (Jan. 25, 1960), p. 1264.

Post; Refractory Binary Borides, pp. 302–303.

Aronsson; Borides, Silicides and Phosphides, p. 3.

*Primary Examiner*—Lewis Gotts
*Assistant Examiner*—D. R. Phillips
*Attorney, Agent, or Firm*—Cushman, Darby & Cushman

[57] ABSTRACT

Aliphatic dinitriles are hydrogenated to aliphatic diamines, for example adiponitrile or 1,4-dicyanobutene are converted to hexamethylene diamine, by heating with hydrogen in the presence of a reduced cobalt borate catalyst. The catalyst is obtained by heating precipitated cobalt borate in the presence of hydrogen, and is made more active by treating, prior to reduction, with an aqueous solution of an alklai, especially an alkali metal carbonate.

7 Claims, No Drawings

HYDROGENATION PROCESS

This invention relates to a process for the manufacture of aliphatic diamines, particularly hexamethylene diamine.

It is known to manufacture aliphatic diamines by hydrogenating aliphatic dinitriles. Such hydrogenations are usually carried out in the presence of ammonia in order to minimise the formation of unwanted by-products, particularly when cobalt oxide is used as catalyst. The use of cobalt boride catalysts, obtained by interacting cobalt compounds with boron-containing reducing agents, is also known, but such catalysts are expensive to make and are not readily producible in pellet form. This is because once the cobalt boride is precipitated it must be kept in an inert oxygen-free atmosphere, so is not suitable for pelleting in standard pelleting equipment.

The present invention uses a catalyst designated "reduced cobalt borate" in order to distinguish it from the previously used "cobalt boride" catalyst. Reduced cobalt borate catalyst may be made by precipitating cobalt borate from aqueous solution (e.g. by interaction of borax with a soluble cobalt salt), separating and drying the precipitate and reducing it in the presence of hydrogen at elevated temperatures, e.g. 200° to 500°C, preferably 300° to 350°C, and if desired under pressure, e.g. at 1 to 300 atmospheres. Advantageously this catalyst may be produced in pelleted form by conventional pelleting techniques since cobalt borate is more stable than cobalt boride and may be exposed to air during pelleting without harm. If desired, however, it can be used in a more finely particulate form. Supported forms of the catalyst can readily be made by carrying out the precipitation in presence of supporting material such as kieselguhr, silica, asbestos, alumina or carbon.

According to the invention a process for manufacturing an aliphatic diamine comprises hydrogenating an aliphatic dinitrile in the presence of reduced cobalt borate as catalyst.

Aliphatic dinitriles used in the process of the invention may contain saturated or unsaturated chains of carbon atoms. The invention is of particular interest for the hydrogenation of adiponitrile and of 1,4-dicyanobutene to hexamethylenediamine.

The process may be operated either batchwise or continuously, under conditions of temperature and pressure similar to or lower than those commonly used in hydrogenating aliphatic dinitriles, particularly adiponitrile, in presence of a cobalt oxide catalyst. Thus, the temperature may be, for example, from 50° to 200°C depending on the activity of the catalyst, and the pressure 1 to 500 atmospheres. The heat liberated by the reaction may be absorbed by external or internal cooling or by evaporation of a solvent. If desired the process may be operated in presence of ammonia, but even in the total absence of ammonia the amount of unwanted by-products produced is small. In particular only small amounts of the difficulty removable compound diaminocyclohexane (DACH) are produced from adiponitrile. Thus, if ammonia is present at all, the amount used is desirably not greater than 10%, or preferably 5% by weight of the dinitrile. The results obtained in the absence of ammonia are much superior to those obtained when a reduced cobalt oxide catalyst is used in the absence of ammonia. The ability to dispense with ammonia in the manufacture of hexamethylenediamine from adiponitrile results in saving of the capital equipment required for ammonia circulation and recovery.

Purification of the crude diamines, e.g. hexamethylene diamine, produced by the process is straightforward and can be accomplished in known manner, for example by rectification techniques.

In preparing the reduced cobalt borate catalyst for use in the process of the invention the precipitation of cobalt borate may be carried out at any temperature from 0° to 100°C but the preferred temperature is 50° – 80°C. For best results the precipitate should be treated, e.g. by washing, with an aqueous solution of an alkali. In particular ammonia or organic amines, e.g. pyridine or triethylamine, or preferably alkali metal carbonates, hydroxides, bicarbonates or borates may be used in such treatment. Washing with alkali metal carbonates produces especially active catalysts, by use of which high yields of hexamethylenediamine are obtained. It has already been proposed in U.S. Pat. No. 2,784,232 to hydrogenate fatty nitriles containing 8 or more carbon atoms to fatty amines, e.g. stearic nitrile to octadecylamine, in the presence of a reduced nickel borate catalyst. When such nickel catalysts are applied to the hydrogenation of aliphatic dinitriles they give inferior yields of diamines compared with reduced cobalt borate catalysts which have been activated under comparable conditions.

The invention is illustrated but not limited by the following Examples in which the parts are by weight.

EXAMPLE 1

A solution of 60 parts of cobalt nitrate in 150 parts of water was added to a solution of 48 parts of borax in 400 parts of water and the mixture stirred at 70°C for 2 hours. It was then cooled and the precipitate filtered and washed with 2½% aqueous borax solution, and then water until the filtrate was colourless. It was then washed with 5% aqueous sodium carbonate and again with water until the filtrate was neutral. The solid was dried in vacuo at 80°C, and finally it was heated in a stream of hydrogen at 340°C for 69 hours.

An autoclave was charged with adiponitrile (50 parts), reduced cobalt borate (1.5 parts), prepared as above, pyridine (0.5 parts) and pressurised with hydrogen to 180 atmospheres. It was then heated at 100°C for 20 hours. The product contained 92% of hexamethylenediamine, 7% of hexamethylene imine annd traces of diaminocyclohexane (DACH), aminocapronitrile (ACN) and hexamethylenetriamine (HMT).

EXAMPLE 2

Cobalt borate was prepared as in Example 1, but washed with 10% sodium carbonate solution instead of a 5% solution. After drying it was heated at 320°C in a stream of hydrogen for 26 hours.

An autoclave was charged with adiponitrile (50 parts), reduced cobalt borate (1.5 parts) as prepared above, pyridine (0.5 parts) and pressurised with hydrogen at 130 atmospheres. It was then heated at 100°C for 24 hours. The product contained 93% of hexamethylenediamine, 3% of hexamethylene imine, 2% of HMT and traces of DACH and adiponitrile.

EXAMPLE 3

Cobalt borate was prepared as in Example 1, washed with 2½% aqueous borax solution and with water until the filtrate was colourless. The precipitate was then stirred in a 10% solution of ammonia liquor in water for 1 hour, filtered, washed with water and dried in vacuo.

It was then heated in a stream of hydrogen at 350°C for 70 hours.

An autoclave was charged with adiponitrile (50 parts), reduced cobalt borate (1 part) prepared as above, pyridine (0.5 parts) and pressurized with 170 atmospheres of hydrogen. It was then heated at 100°C for 21 hours. The product contained 55% of unreduced adiponitrile, 24% of aminocapronitrile, 20% of hexamethylenediamine and a trace of hexamethylene imine.

EXAMPLE 4

Cobalt borate was prepared as in Example 1, filtered and washed with 2½% aqueous borax solution then water until the filtrate was colourless. The precipitate was slurried up in 10% aqueous pyridine solution, heated to boiling for 20 minutes, cooled, filtered, washed with water and dried in vacuo. It was then heated in a stream of hydrogen at 350°C for 70 hours.

An autoclave was charged with adiponitrile (50 parts), reduced cobalt borate (1 part) prepared as above, pyridine (0.5 parts) and pressurised with hydrogen at 170 atmospheres. It was then heated at 100°C for 21 hours. The product contained 60% of adiponitrile, 24% of aminocapronitrile, 15% of hexamethylenediamine and a trace of hexamethylene imine.

EXAMPLE 5

Cobalt borate was prepared as in Example 1, but washed with 10% sodium carbonate solution instead of 5% solution. After drying it was heated in a stream of hydrogen at 320°C for 22 hours.

An autoclave was charged with 1,4-dicyanobutene-2 (35 parts), reduced cobalt borate (1 part) as prepared above, and pressurized with hydrogen at 180 atmospheres. It was then heated at 100°C for 20 hours. The product contained 10% of adiponitrile, 10% of aminocapronitrile, 41% of hexamethylene diamine and 5% of hexamethylene imine.

EXAMPLE 6

A solution of 40 parts of nickel nitrate in 100 parts of water was added to a solution of 32 parts of borax in 200 parts of water and the mixture stirred at 70°C for 2 hours. It was then cooled and the precipitate filtered and washed with a 2½% aqueous borax solution, and then with water until the filtrate was neutral. The solid was dried in vacuo at 80°, and finally it was heated in a stream of hydrogen at 350°C for 70 hours.

An autoclave was charged with adiponitrile (50 parts), reduced nickel borate (1.5 parts), prepared as above, pyridine (0.5 parts) and then pressurised with hydrogen to 180 atmospheres. It was then heated at 100°C for 20 hours. The product contained 81% of hexamethylenediamine, 9% of hexamethylene imine, 5% aminocapronitrile, 4% hexamethylene triamine, 1% adiponitrile and a trace of diaminocyclohexane.

EXAMPLE 7

An autoclave was charged with adiponitrile (50 parts), reduced cobalt oxide catalyst (1.5 parts) and pyridine (0.5 parts) and pressurised with hydrogen to 180 atmospheres. It was then heated at 100°C for 20 hours. The product contained 40% hexamethylenediamine, 15% hexamethylene imine, 4% diaminocyclohexane, 4% adiponitrile and 35% hexamethylene triamine.

I claim:

1. A process for the manufacture of hexamethylene diamine which comprises hydrogenating adiponitrile or 1,4-dicyanobutene by heating with hydrogen at a temperature of 50° to 200°C at a pressure of 1 to 500 atmospheres in the presence of a reduced cobalt borate catalyst.

2. The process of claim 1 operated in the presence of not more than 10% by weight of ammonia.

3. The process of claim 1 in which the reduced cobalt borate catalyst has been obtained by reducing precipitated cobalt borate in the presence of hydrogen at a temperature of 200° to 500°C.

4. The process of claim 3 in which the precipitated cobalt borate is treated prior to reduction with an aqueous solution of an alkali.

5. The process of claim 4 in which the precipitated cobalt borate is washed prior to reduction with an aqueous solution of an alkali metal carbonate.

6. The process of claim 1 in which the reduced cobalt borate catalyst is in pelleted form.

7. The process of claim 1 for the manufacture of hexamethylenediamine by heating adiponitrile or 1,4-dicyanobutene with hydrogen at 50° to 200°C and a pressure of 1 to 500 atmospheres in the presence of a reduced cobalt borate catalyst, said catalyst having been obtained by precipitating cobalt borate from aqueous solution, washing with precipitate with an aqueous solution of an alkali metal carbonate, drying and heating in hydrogen at a temperature of 300° to 350°C at a pressure of 1 to 300 atmospheres.

* * * * *